United States Patent [19]

Cayton

[11] 4,203,697
[45] May 20, 1980

[54] TRANSFER APPARATUS FOR PALLETIZED LOADS

[75] Inventor: David W. Cayton, Cupertino, Calif.

[73] Assignee: Bud Antle, Inc., Salinas, Calif.

[21] Appl. No.: 809,785

[22] Filed: Jun. 24, 1977

[51] Int. Cl.² .............................................. B60P 1/64
[52] U.S. Cl. ................................ 414/345; 280/79.1 R; 414/396; 414/500; 410/67
[58] Field of Search ............... 214/38 B, 38 BA, 38 D, 214/515, 516, 517, 152, 85.5; 105/4 R, 159, 366 R; 280/79.1 R; 414/339, 345, 352, 395, 396, 400, 500, 538, 559

[56] References Cited

U.S. PATENT DOCUMENTS

| | | | |
|---|---|---|---|
| 2,512,798 | 6/1950 | Hodges | 214/517 X |
| 2,820,560 | 1/1958 | Davis | 214/38 D X |
| 3,007,588 | 11/1961 | Cull | 214/38 B |

FOREIGN PATENT DOCUMENTS 2501414 1/1975 Fed. Rep. of Germany ........ 214/38 D

Primary Examiner—Robert G. Sheridan
Attorney, Agent, or Firm—Thomas H. Olson

[57] ABSTRACT

The flatbed of a truck that is geared for traverse of an agricultural field is provided with at least one pair of longitudinally extending tracks. Disposed in the tracks for rolling movement thereon is a plurality of roller supported assemblies which are adapted to support pallets of more or less conventional form. The roller supported assemblies are arranged to retain a plurality of pallets consolidated into a single group. An over-the-road carrier, such as a trailer or a semi-trailer, has a similar pair of longitudinally extending slots so that after the agricultural truck is loaded during transverse of the field, it can be backed adjacent to the carrier so that the tracks on the vehicle and the tracks on the carrier are in registry. A winch carries a cable which is attachable to the grouped pallets to effect transfer of the pallets from the truck bed to the carrier bed.

2 Claims, 19 Drawing Figures

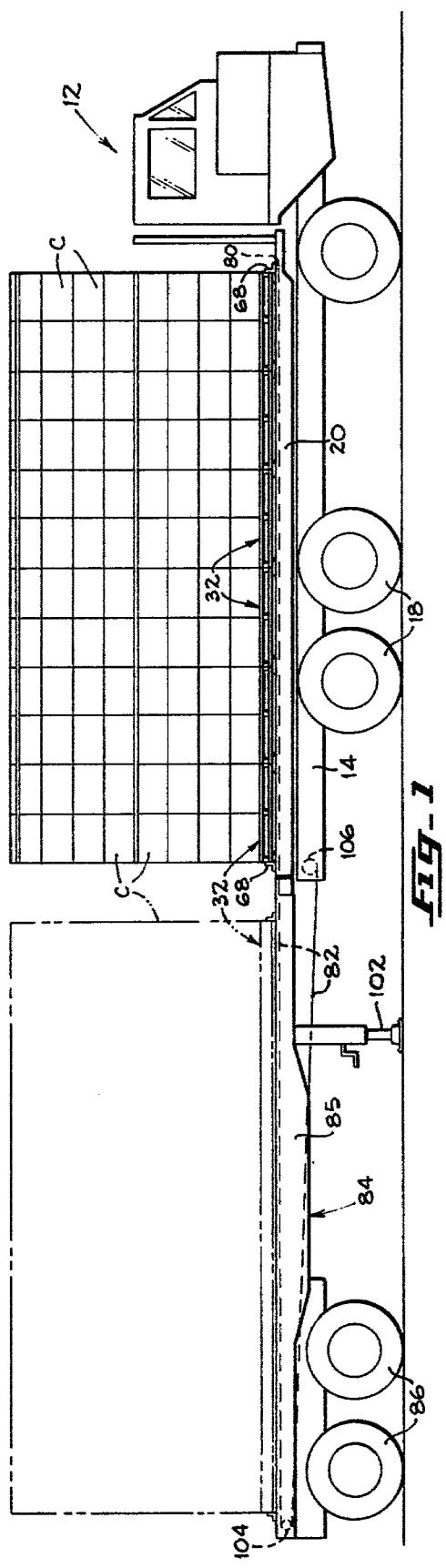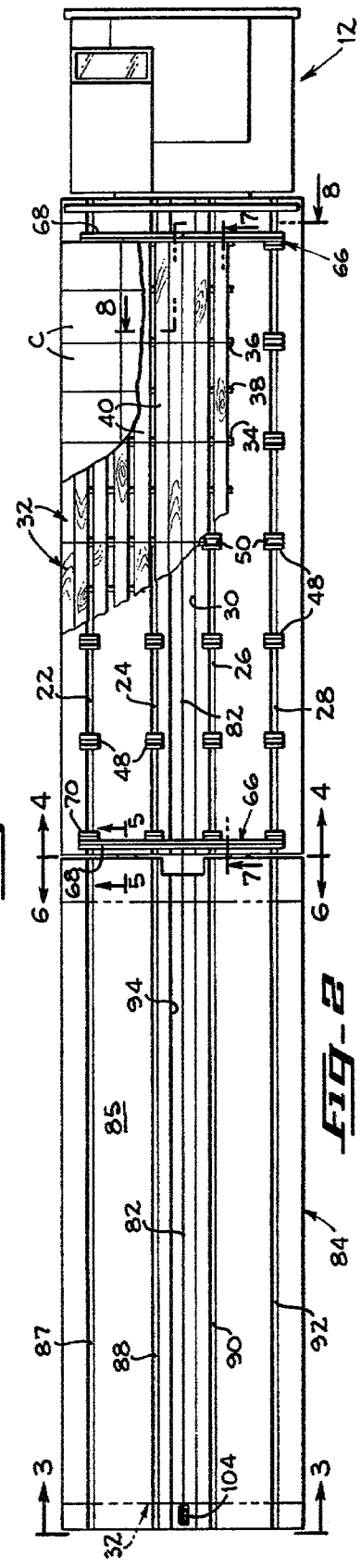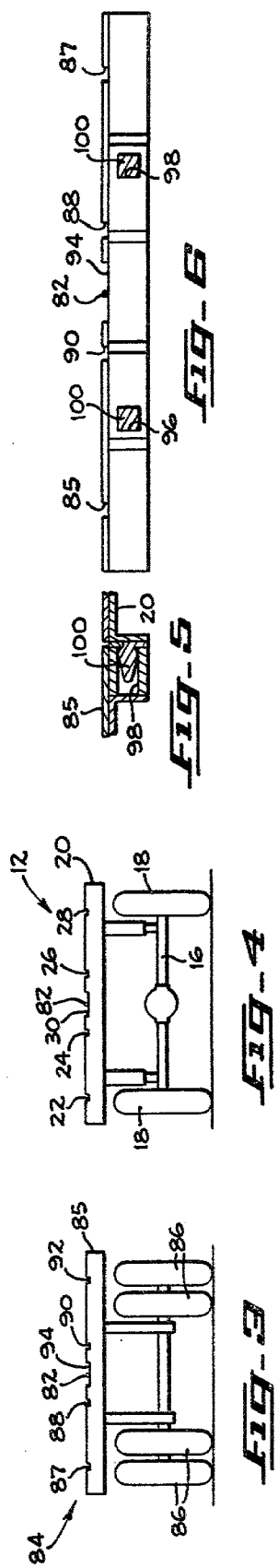

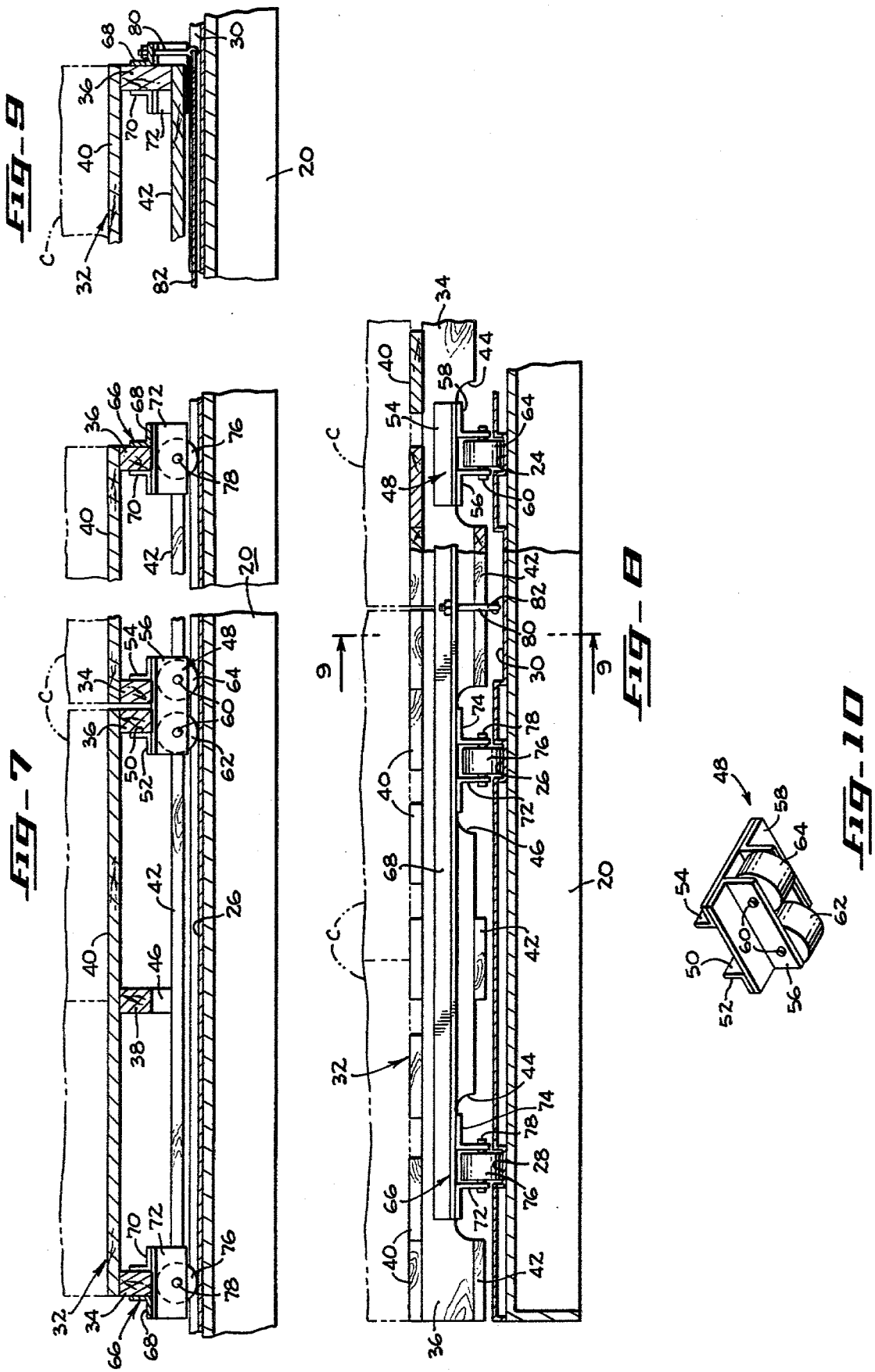

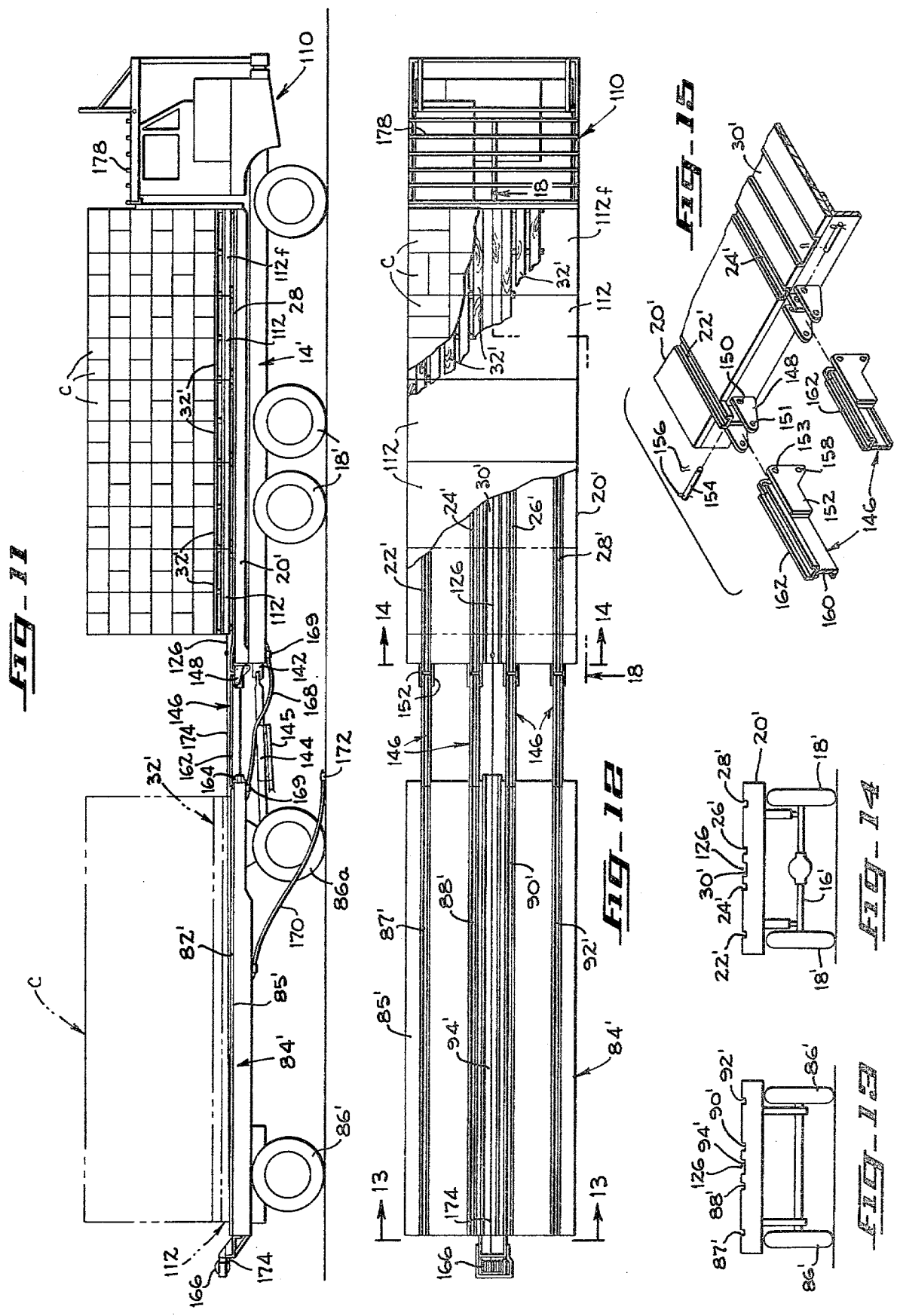

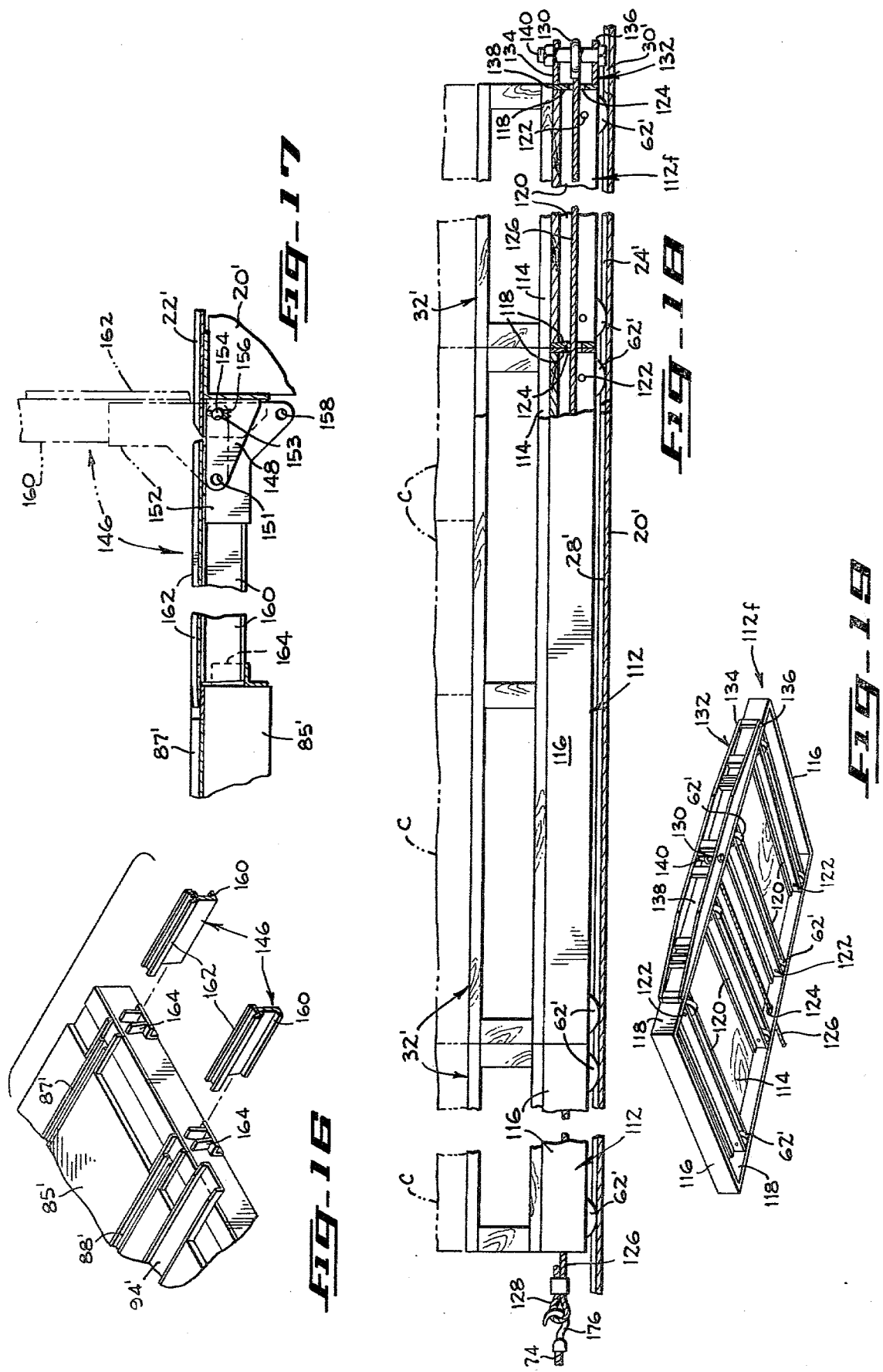

TRANSFER APPARATUS FOR PALLETIZED LOADS

BACKGROUND OF THE INVENTION

1. Field of the Invention

This invention relates to a method and apparatus for expediting transportation of agricultural products from the field in which the products are grown to the final consumer, and, more particularly, to a system for efficiently transferring a consolidated group of palletized agricultural products from a truck geared for traverse of an agricultural field onto a trailer, semi-trailer, or like carrier.

2. Description of the Prior Art

One presently practiced procedure for loading agricultural produce, such as cartons of lettuce, onto an over-the-road carrier is to provide an agricultural vehicle that is geared to traverse the field in which the produce is grown and from which the produce is harvested and packed in cartons, to load the cartons onto the bed of such vehicle, and then to drive the loaded vehicle to a remotely located central loading station at which the produce is loaded onto an over-the-road carrier by means of a forklift tractor or the like. Because the agricultural vehicle is geared to traverse an agricultural field, it is not efficient for over-the-road travel, in consequence of which substantial energy is wasted in transporting the products from the field to the central loading station. Additionally, in practicing the prior art procedure, there are substantial periods during which the products may be exposed to the elements, which has a deleterious effect on the products.

SUMMARY OF THE INVENTION

According to the present invention, a conventional agricultural vehicle that is designed to traverse agricultural fields is provided with a bed in which is formed at least one pair of slots that extend longitudinally of the bed. In the preferred form of the invention there are two pairs of such slots spaced symmetrically of the longitudinal center line of the vehicle. There is a plurality of roller supported assemblies having rollers sized to fit in and roll along the slots. The roller assemblies are adapted to support conventional wood pallets so that the pallets are rollable on the truck bed. Thus, a vehicle embodying the present invention supports a plurality of pallets in an organized or consolidated group on the bed of the vehicle.

The invention also includes a more or less standard over-the-road carrier, such as a trailer or a semi-trailer, in which the bed is modified to have an equivalent number of slots which are spaced so as to register with the slots on the bed of the agricultural vehicle. The rear of the agricultural vehicle and the forward end of the carrier are provided with interengaging members so that the two beds can be juxtaposed with the slots in registry, whereupon the entire pallet group, including the commodities loaded thereon can be rolled from the agricultural vehicle to the over-the-road carrier.

An object of the invention is to provide a method for expediting transport of perishable agricultural products from the field in which the products are grown to the consumers of the same. This object is achieved according to the present invention by providing an agricultural track adapted to traverse a field in which the products are growing, loading cartons of the products onto a group of pallets disposed on the bed of the vehicle, moving the vehicle to a site adjacent to the agricultural field and rolling the group of pallets from the bed of the vehicle onto the bed of an over-the-road cargo carrier, such as a trailer or a semi-trailer.

Another object is to provide a method for accomplishing the foregoing mode of operation by providing pairs of parallelly extending slots in the agricultural vehicle bed and in the cargo carrier bed, the slots being equally spaced apart so that they can be moved into registry, and by providing rollers which roll within the slots and support the above-mentioned pallets.

A further object is to provide a roller supported assembly which, in addition to supporting the pallets for rolling movement within the slots, functions to retain the pallets in juxtaposed condition.

Yet another object is to provide apparatus for efficiently rolling the grouped pallets from the bed of the agricultural vehicle onto the bed of the over-the-road cargo carrier. This object is achieved by providing in the beds of the respective vehicles a centrally extending channel for supporting and guiding a cable. The free end of the cable is secured to the forward extremity of the group of pallets and the opposite end of the cable extends along the slots and around a sheave disposed in the rear of the over-the-road cargo carrier to a winch carried on the agricultural vehicle. Accordingly, when the winch is driven, the grouped pallets and the agricultural products thereon are subjected solely to compressive loading during movements onto the over-the-road carrier.

Still another object is to provide apparatus of the type referred to above which provides smooth transport of the grouped pallets from the bed of the agricultural vehicle to the bed of the over-the-road cargo carrier. This object is achieved according to one embodiment of the invention by providing at the rear of the agricultural vehicle a protruding member and by providing in the forward end of a semi-trailer a socket for receiving the protruding member. Because semi-trailers are typically provided at the forward end thereof with a "landing gear," which affords vertical adjustment of the front of the trailer, the height of the front of the trailer can be adjusted to afford alignment of the protruding member in the socket so that the tracks on the respective beds can be precisely aligned with one another. According to another embodiment of the invention, a trailer is employed as the carrier, and folding ramp members, pivotally mounted on the rear of the agricultural vehicle, can be lowered to form a bridge between the vehicle and the carrier, over which bridge the roller supported assemblies can be rolled in transferring loaded pallets to the carrier.

The foregoing, together with other objects, features and advantages, of the invention will be more apparent after referring to the following specification and the accompanying drawings.

BRIEF DESCRIPTION OF THE DRAWINGS

FIG. 1 is an elevation view of an agricultural vehicle engaged with a semi-trailer and equipped with the apparatus according to one embodiment of the invention.

FIG. 2 is a plan view of FIG. 1 with portions being broken away to reveal certain details.

FIG. 3 is a rear view of a semi-trailer taken at line 3—3 of FIG. 2.

FIG. 4 is a rear view of an agricultural vehicle taken along line 4—4 of FIG. 2.

FIG. 5 is a cross sectional view of an alignment socket taken along line 5—5 of FIG. 2.

FIG. 6 is a view taken at 90° of FIG. 5 and along line 6—6 of FIG. 2.

FIG. 7 is an elevation view at enlarged scale showing the details of the pallet-supporting roller assemblies of one embodiment of the invention and taken along line 7—7 of FIG. 2.

FIG. 8 is an end view of the roller assemblies taken along line 8—8 of FIG. 2.

FIG. 9 is a fragmentary cross sectional view taken along line 9—9 of FIG. 8.

FIG. 10 is a perspective view of a roller assembly employed in practicing one embodiment of the invention.

FIG. 11 is an elevation view of an agricultural vehicle engaged to a trailer and equipped with apparatus according to another embodiment of the invention.

FIG. 12 is a plan view of FIG. 11 with portions being broken away to reveal certain details.

FIG. 13 is an elevation view taken along line 13—13 of FIG. 12.

FIG. 14 is an elevation view taken along line 14—14 of FIG. 12.

FIG. 15 is an exploded fragmentary perspective view of the folding ramp members secured to the rear of the agricultural vehicle shown in FIG. 1.

FIG. 16 is a fragmentary perspective view of the opposite end of the ramp members of FIG. 15.

FIG. 17 is a fragmentary elevation view of the ramp members secured to the rear of the agricultural vehicle.

FIG. 18 is a view at enlarged scale taken along line 18—18 of FIG. 12 and showing the details of the roller supported pallet supporting member.

FIG. 19 is a perspective view showing the underside of the forwardmost roller supported platform of FIG. 18.

DESCRIPTION OF THE PREFERRED EMBODIMENTS

Referring more particularly to the drawings, and specifically to FIGS. 1-10, reference numeral 12 indicates an agricultural truck, one such commercially available truck being sold under the tradename "Fabco." Such agricultural truck is characterized by having all wheels driven at low gear ratios so that the truck can traverse relatively soft agricultural fields in which crops are grown. The truck includes a longitudinally extending frame 14 on which are supported axles 16 to which are mounted wheels 18. As can be seen in FIG. 4, the wheels 18 all reside in two longitudinally extending planes on opposite sides of the vehicle in order that the vehicle can be moved along furrows between rows of growing crops without damaging the crops. Because wheels 18 are confined in two and only two longitudinally extending planes, the load capability of the vehicle 12 is somewhat limited and because of the low gear ratios, necessary in a vehicle which traverses soft surfaces, the vehicle is not capable of high speeds even on paved highway surfaces.

Vehicle 12 includes a flat bed 20. As can be seen in FIGS. 4 and 8, bed 20 is formed with two pairs of longitudinally extending track grooves, track grooves 22 and 24 forming a lefthand pair, and track grooves 26 and 28 forming the righthand pair. Individual grooves in each pair are spaced from one another by an equal amount and the pairs are disposed symmetrically of the center line of the bed. There is a channel 30 extending along the center line. The spacing between individual track grooves in each pair preferably corresponds to dimensional relationships that are standard in certain pallets.

Referring to FIG. 8, a standard pallet 32 is shown in end view. The pallet includes two end beams 34 and 36 and a center beam 38, which are typically formed of nominal two-by-four lumber mounted so that the four-inch dimension is vertical. End beams 34 and 36 define the peripheral margins of two opposite sides of pallet 32. Spanning the upper edges of the beams 34, 36 and 38 is a plurality of cross members 40 which are nailed to the beams and define the upper load supporting surface of the pallet. At the lower surface of the beams are fixed cross members 42 which contribute to the strength and integrity of the pallet. As seen in FIG. 8, the beams 34, 36 and 38 are excised to define forklift notches 44 and 46 which are symmetrical of the center of the pallet and are spaced from one another by an amount corresponding to the spacing between the tines or like load supporting members of a forklift truck. Thus, the pallet 32 can be lifted by a forklift approaching it either from the ends or from the sides.

According to the invention, there are roller supported assemblies 48 which function to maintain a group of pallets 32 into an organized or consolidated pattern on bed 20 and to support the grouped pallets for movement longitudinally of bed 20. Each roller assembly 48 includes a frame composed of four angle irons. Such frame defines on the upper surface thereof a slot 50 which has a width sufficient to receive two pallet beams 34 and 36 therein. The slot is formed by the vertical legs of two angle irons 52 and 54. The horizontal legs of the angle irons are fixed as by welding to the horizontal legs of angle irons 56 and 58, the vertical legs of which confront one another in parallel spaced apart relation. Angle irons 56 and 58 are fixed perpendicularly of angle irons 52 and 54. Axle pins 60 span the space between the vertical legs of angle irons 56 and 58 and support rollers 62 and 64 for free rotation. The rollers have an axial dimension slightly less than the width of track grooves 22, 24, 26 and 28 in bed 20. As can be seen most clearly in FIG. 8, the length of upper angle irons 52 and 54 is slightly less than the length of notches 44 and 46 in the pallet so that the roller assemblies fit securely within the slots. Two roller assemblies 48 are provided at each transversely extending line of abutment between adjacent pallets. Thus, the roller assemblies perform the dual function of retaining adjacent pallets in abutting relation and supporting the pallets for rolling movement on the vehicle bed 20.

For supporting opposite longitudinal ends of the pallet group there are roller frames 66. Each roller frame 66 includes a long upper angle iron 68 which has a length sufficient to span the distance between outermost pallet notches 44 of two juxtaposed pallets. The vertical leg of angle iron 68 defines one surface of a slot, the opposite surface of which is formed by four relatively short angle iron sections 70 which have a length equivalent to the length of angle irons 52 and 54 in roller assembly 48. At locations along angle irons 68 corresponding to the position of pallet notches 44 and 46 are perpendicularly oriented lower angle irons 72 and 74. The horizontal legs of angle irons 72 and 74 are secured to the horizontal legs of angle irons 68 and 70, and the vertical legs are spaced apart from one another to accommodate a roller 76 which is supported between the vertical legs by an axle 78. Thus, roller frames 68 support the front and rear extremities of the pallet group for movement along the track grooves in bed 20 and retain the pallets engaged thereon against outward movement. As shown in FIG. 9, the front roller frame is provided with a fitting 80 to which a cable 82 can be attached.

A semi-trailer 84 having a flat bed 85 is employed in practicing this embodiment of the invention. As shown in FIG. 3, semi-trailer 84 has tandem wheels 86 which fit the trailer for efficient over-the-road transport but which virtually preclude use of the semi-trailer on fields on which crops are growing. Bed 85 is provided with longitudinally extending track grooves 87, 88, 90 and 92 which are spaced from one another as are track grooves 22, 24, 26 and 28 in bed 20 of vehicle 12. Extending along the center of bed 85 is a channel 94 which registers with channel 30 when the vehicle and the semi-trailer are in alignment as shown in FIGS. 1 and 2. For facilitating such alignment, the front end of trailer 84 is provided with a pair of socket openings 96 and 98. The rear end of vehicle 12 is provided with protuberances 100 which are positioned for entry into sockets 96 and 98 such that the slots in the respective beds will be aligned in registry when the protuberances engage the slots. For facilitating entry of protuberances 100, the protuberances are tapered as shown in FIG. 5. Horizontal alignment between the protuberances and the sockets is achieved by maneuvering vehicle 12, and vertical alignment is achieved by adjusting the height of the front end of the trailer 84 by means of a landing gear 102 which is included with most if not all semi-trailers.

At the rear end of trailer 84 in alignment with channel 94 is a sheave 104. Sheave 104 guides cable 82 from a cable winch 106 mounted below bed 20 at the rear of vehicle 12, along channels 94 and 30, and to fitting 80 at the front of the pallet group.

In operation of this embodiment, the apparatus and method of the invention functions as follows: a group of pallets 32 is loaded onto bed 20 of vehicle 12 and there supported by a plurality of roller assemblies 48 and front and rear roller frames 66. In the embodiment shown in FIGS. 1-10 of the drawings, there are two longitudinal rows of six pallets each. At the transversely extending boundary or line of abutment between each pair of adjacent pallets, two roller assemblies 48 are installed, the respective rollers 62 and 64 of each assembly being disposed in one of the track grooves 22-28 in bed 20. Because slot 50 in each roller assembly has a width corresponding to the aggregate thickness of pallet beams 34 and 36, the two adjacent pallets are fixed relative one to another so that the entire group of twelve pallets 32 is retained in a consolidated group or pattern. The pallets are clamped or otherwise fixed onto bed 20 by conventional means not shown and vehicle 12 moves across a field in which crops are growing. The crops are picked and are packed in cartons C; in the case of lettuce, each carton C contains from about twelve to twenty-four heads of lettuce, the particular number depending on the size of the lettuce and the size of the carton. The cartons are loaded onto the pallets in an organized manner and are preferably stacked on the pallets in a manner as disclosed in commonly assigned, copending U.S. patent application Ser. No. 708,335, filed July 26, 1976, now abandoned. When the pallets on vehicle 12 are fully loaded, the vehicle then moves beyond the field to a site adjacent the field, such site preferably being a paved or like hard surface. On such surface, semi-trailer 84 can be parked. Vehicle 12 is backed toward the front end of semi-trailer 84, and the height of the front end of the trailer is adjusted by manipulation of landing gear 102 until protuberances 100 on the vehicle align with and enter sockets 96 and 98 on the trailer. Engagement of the protuberances in the sockets retains respective track grooves 87-92 in semi-trailer bed 85 in registry with respective track grooves 22-28 in vehicle bed 20. Next cable 82 is unwound from winch 106, trained down around sheave 104 and placed in channels 94 and 30 beneath the pallet group. The free end of cable 82 is secured to fitting 80 on front roller frame 66. Whatever clamping means that are employed in fixing the pallets to bed 20 of vehicle 12 are released, and power is applied to winch 106 to wind cable 82 onto the winch. This causes the group of pallets on bed 20 to move rearward from vehicle bed 20 and to be drawn onto semi-trailer bed 85. Because the rollers on the roller assemblies and the roller frames are constrained for rolling movement along the aligned track grooves in the vehicle bed and the semi-trailer bed, the organized grouping of the pallets and the cartons thereon is retained. When the pallet group has moved onto bed 85 of the semi-trailer, it is secured by suitable clamping means, not shown. Cable 82 is then disconnected from fitting 80 and rewound onto winch 106. Vehicle 12 is thus available for return to the field to receive another load and trailer 84 is ready for transport over the road.

By way of recapitulation of this embodiment, it will be understood that beds 20 and 85 are provided with two pairs of parallelly spaced track grooves and that a plurality of roller elements are placed in the grooves on vehicle bed 20 for supporting pallets 32 in an organized pattern thereon. Then the vehicle is moved over an agricultural field at which cartons or like food articles are loaded onto the pallets. The vehicle is next moved away from the field and into adjacency to the semi-trailer 84. Finally, the entire group of pallets is rolled from the vehicle bed onto the semi-trailer bed to enable the trailer to be towed at highway speeds to a remote location and to enable the vehicle to return to the field for another load.

Although semi-trailer 84 as exemplified in the accompanying drawings has a length approximately equal to the length of bed 20 of vehicle 12, a semi-trailer of greater length is comprehended within the invention. For example, a semi-trailer having a bed twice the length of vehicle bed 20 is feasible; such larger semi-trailer can receive and transport loads from two agricultural vehicles 12.

The advantageous features of the present invention can be achieved even in those environments where semi-trailers, tractors to pull them and drivers to operate the tractors, are not readily available. The embodiment shown in FIGS. 11-19 is particularly suited for employment in such environment. In FIG. 11 reference numeral 110 identifies an agricultural vehicle substantially identical to vehicle 12 described hereinabove. Because of the substantial identity, reference numerals with the addition of a prime will be employed to identify parts of vehicle 110 that correspond to equivalent parts in vehicle 12. Vehicle 110 includes a frame 14' supported on axles, one of which is shown at 16', and wheels 18'. All wheels of vehicle 110 are aligned in two transversely spaced planes to facilitate movement of the vehicle along furrows between rows of crops. The vehicle has a flat bed 20' which is formed with two pairs of longitudinally extending track grooves, such track grooves being indicated at 22', 24', 26' and 28'. Intermediate track grooves 24' and 26' is a channel 30' which extends along the center of bed 20'.

Supported for rolling movement within the grooves formed on bed 20' is a plurality of roller-supported platform assemblies 112, which in the embodiment of FIGS. 11-19 are five in number. Each platform is substantially coextensive with the width of bed 20' and has a longitudinal direction equivalent to a pallet 32'. In one structure designed according to the invention each platform 112 is 4 feet by 8 feet and accommodates two 4 feet by 4 feet pallets 32'. Each platform includes a top sheet 114, which can be formed of ⅜ inch plywood, circumscribed by vertically extending side panels 116 and end panels 118. Extending along the under side of each platform 112 at zones corresponding to the location of track grooves 20'-28' are pairs of angle irons 120. The horizontal legs of respective angle irons 120 are secured to the under side of sheet 114, and the vertical legs of the angle irons are spaced apart to form roller supporting slots. Through the vertical legs of the angle irons are pins 122 which support rollers 62', in order that each platform 112 and the pallets disposed thereon can be conveniently rolled along bed 20' of vehicle 110.

For maintaining the five roller supported platforms 112 in an organized pattern the midpoint of each end wall 118 is bored as at 124 to receive through the longitudinal center-line of the five roller platforms a cable 126. At the rear end of the grouped platforms, cable 126 is provided with an eye or loop 128. At the forward end the cable is provided with a loop or eye 130 securing the cable to forwardmost roller platform 112f. For this purpose the forward extremity of the forwardmost platform 112f is provided with a transversely extending fixture 132. The fixture includes upper and lower plates 134 and 136. Upper and lower plates 134 and 136 are integral with and perpendicular to a web 138 which bears against the end plate 118 of the roller supported platform 112f. In the transverse center, plates 134 and 136 define coaxial openings to support a bolt or pin 140 therethrough which passes through loop 130 in cable 126. Accordingly, when tension is applied to cable 126 in a leftward direction as viewed in FIG. 18, all roller supported platforms 112 are subjected solely to compressive forces which forces the roller platforms are designed to accommodate in order to move the platforms and the loads supported thereon along the tracks in bed 20'.

Frame 14' of vehicle 110 has at the rear end thereof a hitch 142. A trailer 84' has a tongue 144 the forward extremity of which is adapted to engage with hitch 142 on vehicle 110. Tongue 144 is provided with a pivotally mounted tongue support 145 which is longitudinally adjustable to facilitate aligning the tongue with hitch 142. Trailer 84' has a flat bed 85' which is supported by rear wheels 86' and front wheels 86a at a level substantially equal to the level of bed 20' on vehicle 110. Bed 85' is provided with longitudinally extending track grooves 87', 88', 90' and 92' which are located and spaced identically to the track grooves 22'-28' on bed 20'. Bed 85' also has a centrally extending channel 94' which corresponds in width and location to channel 30' in bed 20'. As can be seen in FIGS. 11 and 12, the length of bed 85' is approximately equal to the length of bed 20' so the load from the former bed can be transferred to the bed of the trailer.

For facilitating such transfer are four substantially identical pivotally mounted bridges 146 at the rear of bed 30' in alignment with track grooves 22'-28'. Because bridges 146 are identical, a description of one will suffice as a description of all. Associated with each bridge 146 is a pair of clevis plates 148 secured to the rear of bed 20' in flanking relation to the respective track grooves in the bed. The clevis plates are coaxially bored to form pivot holes 150 and locking holes 151. Bridge 146 has at the proximal end thereof bearing plates 152 which are spaced from one another for entry between clevis plates 148. Bearing plates 152 are provided with coaxial bores at 153 which cooperate with bores 150 in clevis plates 148 to receive a pivot pin 154 therethrough. Locking clips 156 retain pivot pin 154 in place so that bridge 146 can be pivoted around the axis of the pivot pin. Bearing plates 152 are also provided with coaxial locking bores 158 which cooperate with bores 151 in clevis plates 148 to receive a locking pin therethrough when the bridge is in a vertical position, shown in phantom lines in FIG. 17, and to retain the bridge in such vertical position.

As can be seen in FIGS. 15 and 16, bridge 146 is of composite construction having a lower vertically oriented channel beam 160 to the upper web of which is welded in horizontal orientation a channel 162. Channel 162 defines a continuation of track grooves 22'-28' so that rollers 62' on roller supported platforms 112 can move over the bridge onto the track grooves in bed 85' of trailer 84'. As seen in FIG. 16, the forward end of trailer bed 85' is provided with upward opening sockets 164 which have converging walls so as to receive the distal ends of bridges 146 therein and guide the bridges into alignment with the track grooves 87'-92' on the trailer bed. The length of bridges 146 is such that when tongue 144 is coupled to hitch 142, the distal ends of the bridges are received in and supported by sockets 164.

At the rear of trailer 84' in alignment with central channel 94' is a cable winch 166 which is powered by an electric motor to which power is supplied through an electrical cable 168 from the vehicle battery carried in vehicle 110. Cable connectors 169 are provided at the rear of vehicle 110 and the front of trailer 84' to permit disconnection when the vehicle and trailer are separated. A control cable 170 which terminates in a control head 172 is provided; the control cable has a length such that the operator can control winch 166 through manipulation of the control head while standing in alignment with bridges 146. Winch 166 has a cable 174 wound thereon, which cable terminates in a coupling, such as a hook 176, for establishing a connection between winch cable 174 and cable 126. Vehicle 110 is provided with a rack 178 over the cab thereof which rack is of sufficient strength and size to support ten pallets 32' thereon for a purpose which will become apparent.

In operation, trailer 84' is attached to vehicle 110 by engaging tongue 144 with hitch 142. Except for the presence of five roller platforms 112 the trailer and the vehicle are otherwise empty. Then ten pallets are loaded onto roller platforms 112, two pallets onto each platform. Ten additional pallets are loaded onto rack 178 and there secured. Bridges 146 are raised to the position shown by phantom lines in FIG. 17 and there retained by placement of locking pins through the aligned bores 151 and 158 in clevis plates 148 and bridge bearing plates 152, respectively. The vehicle with trailer 84' attached is then driven to the field from which commodities are to be harvested and transported. The surface of such field is typically quite soft in which case trailer 84' is parked adjacent the edge of the field. If roller platforms are in place on bed 20' of vehicle 110 tongue 144 is disconnected from hitch 142. If on the other hand the grouped roller supported platforms 112 were on bed 85' of the trailer, bridges 146 are lowered and the grouped platforms are rolled forward onto bed 20' of the vehicle. Because of the presence of rollers 62' and the alignment between the track grooves on the trailer, the track grooves defined by bridges 146 and the track grooves on bed 20' of the vehicle, movement of the roller supported platforms onto the vehicle bed can be effected manually.

With the roller platforms 112 in place on vehicle bed 20' and with bridges 146 in the upward or vertical position, vehicle 110 is driven onto the field with wheels 18' aligned with furrows between adjaent rows of growing crops. The crops are manually picked or severed from the field surface and placed in cartons C. Cartons C are then loaded onto pallets 32' which are in place on roller platforms 112. Traversal of the field by truck 110 continues until the cartons are stacked on pallets 32' at an appropriate height. Then truck 110 is driven from the field to the location at which trailer 84' is parked. First tongue 144 is engaged with hitch 142, vehicle 110 is moved forward to effect substantial alignment between the track grooves in the truck bed and the vehicle bed, and bridges 146 are lowered by removing the locking pins and manually lowering the bridges so that their distal ends engage and are supported by sockets 164 on the trailer. Electrical cable 168 is connected by engagement of cable connectors 169 in order to supply power to the motor of winch 166. Next cable 174 is unwound from winch 166 and moved forward along channel 94' in bed 85'. Hook 176 at the end of the cable is engaged in loop 128 of cable 126, and the operator, by manipulation of control head 172, energizes the winch. Because of the length of control cable 170 the operator can stand opposite bridges 146 and ascertain at all times that the load is moving over the bridges smoothly. He then manipulates control head 172 to supply power to winch 166 to wind cable 174 thereon. This applies force to fixture 132 which distributes the force across the width of the platforms and applies only the compressive forces to the platforms. Because the sole connection between adjacent roller supported platforms 112 is through cable 174 and because such cable is flexible, the load moves over bridges 146 even in the presence of slight misalignment arising when the vehicle and/or the trailer are parked on an irregular surface. When the load is in place on bed 85' of trailer 84', a position shown in phantom lines in FIG. 11, the operator manipulates control head 172 to de-energize winch 166. Next tongue 144 is disconnected from hitch 142, bridges 146 are raised to the vertical position and the pallets stored on rack 178 are distributed on bed 20' of vehicle 110. The loaded roller supported platforms on bed 85' are secured by any suitable means, not shown. Thereafter, vehicle 110 again traverses the field and another load of cartons C is placed thereon. Finally, the vehicle returns to the location at which trailer 84 is parked and the trailer is hitched to the vehicle by engagement between tongue 144 and hitch 142. Thereupon the vehicle and the trailer, each fully loaded with cartons C, is driven to a remote processing or loading site where the cartons can be retained in palletized form during handling thereof by conventional forklift equipment. When the vehicle and trailer have been emptied, more pallets can be loaded on and the truck-trailer combination can return to the field for another load.

Thus, it will be seen that the present invention provides an apparatus and method for loading and transporting agricultural commodities which converses time and energy in that the relatively low geared agricultural vehicle is utilized with optimum efficiency. The apparatus employed to effect transfer of the load from the vehicle to the trailer is extremely lightweight and inexpensive and is self contained so that the invention can be practiced in virtually any location without construction of any permanent facilities.

Although two embodiments of the invention have been shown and described, it will be obvious that other adaptations and modifications can be made without departing from the true spirit and scope of the invention.

What is claimed is:

1. Apparatus for transferring a group of loaded pallets from the bed of a vehicle to the bed of a carrier, the pallets including beams having a thickness dimension at the peripheral margins thereof, comprising means forming a first pair of parallelly spaced apart longitudinally extending track grooves on the bed of said vehicle, means forming a second pair of parallelly spaced apart longitudinally extending track grooves on the bed of said carrier, said second pair of track grooves being spaced from one another by an amount equal to said first pair of track grooves, means for supporting said pallets on said vehicle bed, said supporting means including a roller assembly having a frame, an upper portion of said frame defining a slot having a width dimension corresponding to twice said thickness dimension to receive beams of two abutting pallets therein, and a lower portion of said frame having means for supporting at least one roller for rotation about an axis parallel to the width dimension of the slot, said roller being engageable in said track grooves, means for aligning said carrier relative said vehicle so that said first pair of track grooves is in alignment with said second pair of track grooves, and means for drawing said pallets from said vehicle bed onto said carrier bed.

2. Apparatus according to claim 1 wherein said frame includes a pair of parallel upper angle irons having vertical legs which confront one another to define said slot and horizontal legs extending outward said slot, said frame including a pair of parallel lower angle irons extending perpendicularly of said upper angle irons, said lower angle irons having horizontal legs rigidly fixed to the horizontal legs of said upper angle irons, said lower angle irons having vertical legs spaced from one another by an amount corresponding to the axial dimension of said roller, said roller supporting means spanning the space between said vertical legs of said lower angle irons.

* * * * *